United States Patent
Chatterjee et al.

(10) Patent No.: US 8,856,477 B1
(45) Date of Patent: *Oct. 7, 2014

(54) NETWORKED RAID IN A VIRTUALIZED CLUSTER

(71) Applicant: American Megatrends, Inc., Norcross, GA (US)

(72) Inventors: Paresh Chatterjee, Fremont, CA (US); Suresh Grandhi, Fremont, CA (US); Anandh Mahalingam, Fremont, CA (US); Ajit Narayanan, Chennai (IN)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,692

(22) Filed: Nov. 20, 2012

Related U.S. Application Data

(63) Continuation of application No. 13/209,854, filed on Aug. 15, 2011, now Pat. No. 8,316,202, which is a continuation of application No. 12/104,123, filed on Apr. 16, 2008, now Pat. No. 8,001,352.

(60) Provisional application No. 60/923,864, filed on Apr. 17, 2007.

(51) Int. Cl.
  *G06F 12/02* (2006.01)
  *G06F 3/06* (2006.01)
  *G06F 11/14* (2006.01)

(52) U.S. Cl.
  CPC .......... *G06F 3/0689* (2013.01); *G06F 11/1464* (2013.01); *G06F 3/0647* (2013.01); *G06F 3/0658* (2013.01); *G06F 12/02* (2013.01)
  USPC .......................................... 711/165; 711/114

(58) Field of Classification Search
  USPC .................................................. 711/165, 114
  See application file for complete search history.

(56) References Cited

U.S. PATENT DOCUMENTS

| | | |
|---|---|---|
| 4,942,579 A | 7/1990 | Goodlander et al. |
| 5,257,367 A | 10/1993 | Goodlander et al. |
| 5,502,836 A | 3/1996 | Hale et al. |
| 5,720,027 A | 2/1998 | Sarkozy et al. |
| 5,732,238 A | 3/1998 | Sarkozy |

(Continued)

OTHER PUBLICATIONS

U.S. Appl. No. 13/209,854, filed Aug. 15, 2011, entitled "Networked Raid in a Virtualized Cluster," Inventors: Chatterjee et al.

(Continued)

*Primary Examiner* — Hashem Farrokh
(74) *Attorney, Agent, or Firm* — Meunier Carlin & Curfman, LLC

(57) ABSTRACT

Technologies are described herein for providing networked RAID in a virtualized storage cluster. The storage capacity of a storage cluster having two or more storage nodes is organized into tiers. A portion of the available storage capacity is allocated to one tier that is organized using chained declustering. Another portion of the available storage capacity is allocated to another tier that is organized using a networked RAID configuration. The storage cluster monitors the frequency at which data in the storage cluster is accessed. Frequently used data that is stored in the network RAID-configured tier is promoted to the chained declustered-configured tier. Infrequently used data that is stored in the chained declustered-configured tier is demoted to the network RAID-configured tier.

13 Claims, 8 Drawing Sheets

(56) References Cited

U.S. PATENT DOCUMENTS

| | | | |
|---|---|---|---|
| 5,787,459 | A | 7/1998 | Stallmo et al. |
| 5,790,774 | A | 8/1998 | Sarkozy |
| 5,893,919 | A | 4/1999 | Sarkozy et al. |
| 5,974,426 | A | 10/1999 | Lee et al. |
| 6,098,128 | A | 8/2000 | Velez-McCaskey et al. |
| 6,275,898 | B1 * | 8/2001 | DeKoning ............... 711/114 |
| 6,327,638 | B1 | 12/2001 | Kirby |
| 6,484,235 | B1 | 11/2002 | Horst et al. |
| 6,718,436 | B2 | 4/2004 | Kim et al. |
| 6,901,479 | B2 | 5/2005 | Tomita |
| 7,020,758 | B2 | 3/2006 | Fisk |
| 7,324,966 | B2 | 1/2008 | Scheer |
| 7,360,051 | B2 * | 4/2008 | Sugino et al. ............ 711/170 |
| 7,404,102 | B2 * | 7/2008 | Soran et al. ............... 714/5.11 |
| 7,536,529 | B1 | 5/2009 | Chatterjee et al. |
| 7,562,200 | B1 | 7/2009 | Chatterjee et al. |
| 2002/0161983 | A1 | 10/2002 | Milos et al. |
| 2003/0163630 | A1 | 8/2003 | Aasheim et al. |
| 2004/0255189 | A1 | 12/2004 | Chu et al. |
| 2005/0055402 | A1 | 3/2005 | Sato |
| 2006/0031649 | A1 * | 2/2006 | Murotani et al. ......... 711/162 |
| 2006/0248273 | A1 | 11/2006 | Jernigan et al. |
| 2007/0239747 | A1 | 10/2007 | Pepper |
| 2008/0104343 | A1 * | 5/2008 | Miyagaki et al. ......... 711/158 |
| 2008/0320247 | A1 | 12/2008 | Morfey et al. |

OTHER PUBLICATIONS

U.S. Appl. No. 12/425,123, filed Apr. 16, 2009, entitled "Provisioning Space in a Data Storage System," Inventors: Chatterjee et al.

U.S. Appl. No. 12/104,135, filed Apr. 16, 2008, entitled "Container Space Management in a Data Storage System," Inventors: Chatterjee et al.

U.S. Official Action dated Oct. 28, 2010 in U.S. Appl. No. 12/104,135.

U.S. Appl. No. 12/101,236, filed Apr. 11, 2008, entitled "Data Migration Between Multiple Tiers in a Storage System Using Age and Frequency Statistics," Inventors: Chatterjee et al.

U.S. Appl. No. 12/101,238, filed Apr. 11, 2008, entitled "Data Migration Between Multiple Tiers in a Storage System Using Pivot Tables," Inventors: Chatterjee et al.

U.S. Official Action dated Nov. 5, 2010 in U.S. Appl. No. 12/101,238.

U.S. Appl. No. 11/417,801, filed May 4, 2006, entitled "Method, System, and Apparatus for Expanding Storage Capacity in a Data Storage System," Inventors: Chatterjee et al.

U.S. Official Action dated Jul. 8, 2009 in U.S. Appl. No. 11/417,801.

U.S. Official Action dated Mar. 30, 2009 in U.S. Appl. No. 11/417,801.

U.S. Appl. No. 11/254,347, filed Oct. 20, 2005, entitled "Method, System, and Apparatus, and Computer-Readable Medium for Provisioning Space in a Data Storage System," Inventors: Chatterjee et al.

U.S. Notice of Allowance/Allowability dated Jan. 12, 2009 in U.S. Appl. No. 11/254,347.

U.S. Official Action dated Oct. 8, 2008 in U.S. Appl. No. 11/254,347.

U.S. Official Action dated Mar. 18, 2008 in U.S. Appl. No. 11/254,347.

U.S. Official Action dated Sep. 4, 2007 in U.S. Appl. No. 11/254,347.

* cited by examiner

NETWORKED RAID IN A VIRTUALIZED CLUSTER

CROSS-REFERENCE TO RELATED APPLICATIONS

This application is a continuation of U.S. patent application Ser. No. 13/209,854, filed Aug. 15, 2011, entitled "Networked Raid in a Virtualized Cluster," which is a continuation of U.S. patent application Ser. No. 12/104,123, filed Apr. 16, 2008, entitled "Networked Raid in a Virtualized Cluster," which claims the benefit of U.S. provisional patent application No. 60/923,864, filed on Apr. 17, 2007, and entitled "Networked RAID-5 in a Virtualized Cluster," which are expressly incorporated herein by reference in their entireties.

BACKGROUND

A virtualized cluster is a cluster of different storage nodes that together expose a single storage device. Input/output operations ("I/Os") sent to the cluster are internally re-routed to read and write data to the appropriate locations. In this regard, a virtualized cluster of storage nodes can be considered analogous to collection of disks in a Redundant Array of Inexpensive Disks ("RAID") configuration since a virtualized cluster hides the internal details of the cluster's operation from initiators and instead presents a unified device.

The order in which data is laid out among the different nodes within a cluster determines the cluster's configuration. Normally, data is laid out with two considerations in mind: performance and redundancy. Analogous to a RAID configuration, data in a cluster can be either striped across all the nodes or mirrored so that each byte of data is stored in at least two nodes. The former method is useful for high performance and maximal disk capacity utilization. The second method is useful for protecting data when a node fails. Due to the fact that mirrored configurations use twice the amount of physical space for storing the same amount of data, the cost of such configurations per storage unit is twice that of striped systems. Mirrored configurations that support both an odd and even number of nodes in the cluster are called chained declustered configurations.

In a non-networked RAID configuration, a trade-off between cost, performance, and redundancy is achieved through the use of two RAID levels called RAID-5 and RAID-6. These two RAID levels do not provide redundancy through mirroring; rather, they create error-correcting parity blocks out of the data and store the parity information. By utilizing parity blocks, it is possible to restore the data in the case of the failure of one RAID device.

It is extremely difficult, however, to extend RAID to the case of a networked clustered environment. This is because the algorithms needed for synchronizing operations between the nodes become complex and, as a result, there is often a need for sophisticated distributed locking mechanisms. For instance, when a write occurs to a network RAID-5 configuration, the data zone and the parity zone will both need to be updated. This is a compound I/O operation, requiring that the new parity be computed, and the two blocks be written. In order to compute the new parity, it is necessary to first read the old data and old parity, and to perform an exclusive-or ("XOR") operation with the old data, the old parity, and the new data. The entire update operation must also be atomic to maintain the stripe integrity of the parity in the event of a power failure. As a result, multiple networked read and write operations must be performed and a complex distributed locking mechanism must be utilized. This slows the operation of the cluster considerably.

As another example, when a network RAID-5 configuration is degraded due to the failure of a single node, the data on the failed node is reconstructed by reading the desired data from all of the other nodes and performing an XOR operation to regenerate the lost data. This also requires network read operations to be performed across all of the nodes in a cluster and a distributed lock to be applied to the cluster. These operations significantly impact the performance of a cluster that utilizes a network RAID-5 configuration. These considerations have led previous network RAID-5 and RAID-6 implementations in clustered storage to be infeasible for commercial implementations.

It is with respect to these considerations and others that the disclosure made herein is presented.

SUMMARY

Technologies are described herein for providing networked RAID in a virtualized storage cluster. Through the utilization of the technologies and concepts presented herein, networked RAID can be implemented and utilized in a networked storage cluster in a manner that eliminates the compound network read and write operations required in previous solutions. Moreover, the technologies presented herein do not require the use of a distributed locking mechanism. As a result, the technologies presented herein allow for a networked storage cluster that utilizes network RAID to be implemented that is sufficiently performant for commercial implementation.

According to one aspect presented herein, the storage capacity of a storage cluster having two or more storage nodes is organized into tiers. A portion of the available storage capacity is allocated to one tier that is organized using chained declustering. A chained declustered configuration ensures that all data is stored on at least two nodes of a storage cluster. Another portion of the available storage capacity is allocated to another tier that is organized using a networked RAID configuration, such a networked RAID-5 or RAID-6 configuration.

In order to improve performance, the storage cluster monitors the frequency at which data in the storage cluster is accessed. Frequently used data that is stored in the network RAID-configured tier is moved in the background to the chained declustered-configured tier. This process is referred to herein as "promotion." Infrequently used data that is stored in the chained declustered-configured tier is moved in the background to the network RAID-configured tier. This process is referred to herein as "demotion."

According to other aspects, data stored on the storage cluster is organized into "zones." A "zone" represents the amount of data that is stored on each storage node in a storage cluster when data is striped across the storage nodes. In order to promote a zone, data stored in the zone is moved from the network RAID-configured tier to the chained declustered-configured tier. In order to demote a zone, data stored in the zone is moved from the chained declustered-configured tier to the network RAID-configured tier. In one implementation, the zone size for zones stored in the chained declustered-configured tier is the same as for zones stored in the network RAID-configured tier.

In another implementation, the zone size for zones stored in the chained declustered-configured tier is different than for zones stored in the network RAID-configured tier. In this implementation, a zone is demoted by reading the zone from the chained declustered-configured tier, subdividing the zone into sub-zones, calculating the parity of the sub-zones, and storing the sub-zones and the parity in the network RAID-configured tier on different storage nodes. For instance, if there are N storage nodes in the storage cluster, a zone is demoted by subdividing a zone stored in the chained declustered-configured tier into N−1 sub-zones, calculating the parity of the sub-zones, and storing each of the sub-zones and the parity in the network RAID-configured tier on different storage nodes. A zone is promoted in this embodiment by reading a sub-zone from each of the storage nodes in the second tier, assembling the sub-zones into a zone, and storing the zone in the first tier of the storage cluster.

According to another aspect, a zone stored in the chained declustered-configured tier of the storage cluster is further subdivided to match the underlying stripe size of the network RAID-configured tier. In this embodiment, a zone is demoted by reading a zone from the chained declustered-configured tier, subdividing the zone into sub-zones, further subdividing each sub-zone into stripes, calculating a parity stripe for each sub-zone, and storing a stripe from each sub-zone and a parity stripe on different nodes of the network RAID-configured tier of the storage cluster. A zone is promoted in this embodiment by reading stripes from each node in the storage cluster, assembling the stripes into sub-zone, assembling the sub-zones into a zone, and storing the assembled zone in the chained declustered-configured tier of the storage cluster.

According to yet another aspect, data is organized on the storage nodes in a manner that reduces the overhead of re-striping the storage nodes when a new storage node is added to the storage cluster. In particular, in one implementation, data is striped across the nodes using a data placement algorithm ("DPA") that ensures that when a new storage node is added to a cluster and data is re-striped between the storage nodes, only data that will subsequently reside in the new storage node is moved to the new storage node during re-striping. The DPA utilized in embodiments also ensures that no movement of data occurs between two storage nodes that existed in the storage cluster prior to the addition of the new storage node. Other mechanisms may also be utilized to stripe data across the storage nodes of a storage cluster.

It should be appreciated that while the embodiments described herein are presented in the context of network RAID-5, the concepts described here are equally applicable to RAID-6 and other parity-based network storage algorithms. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
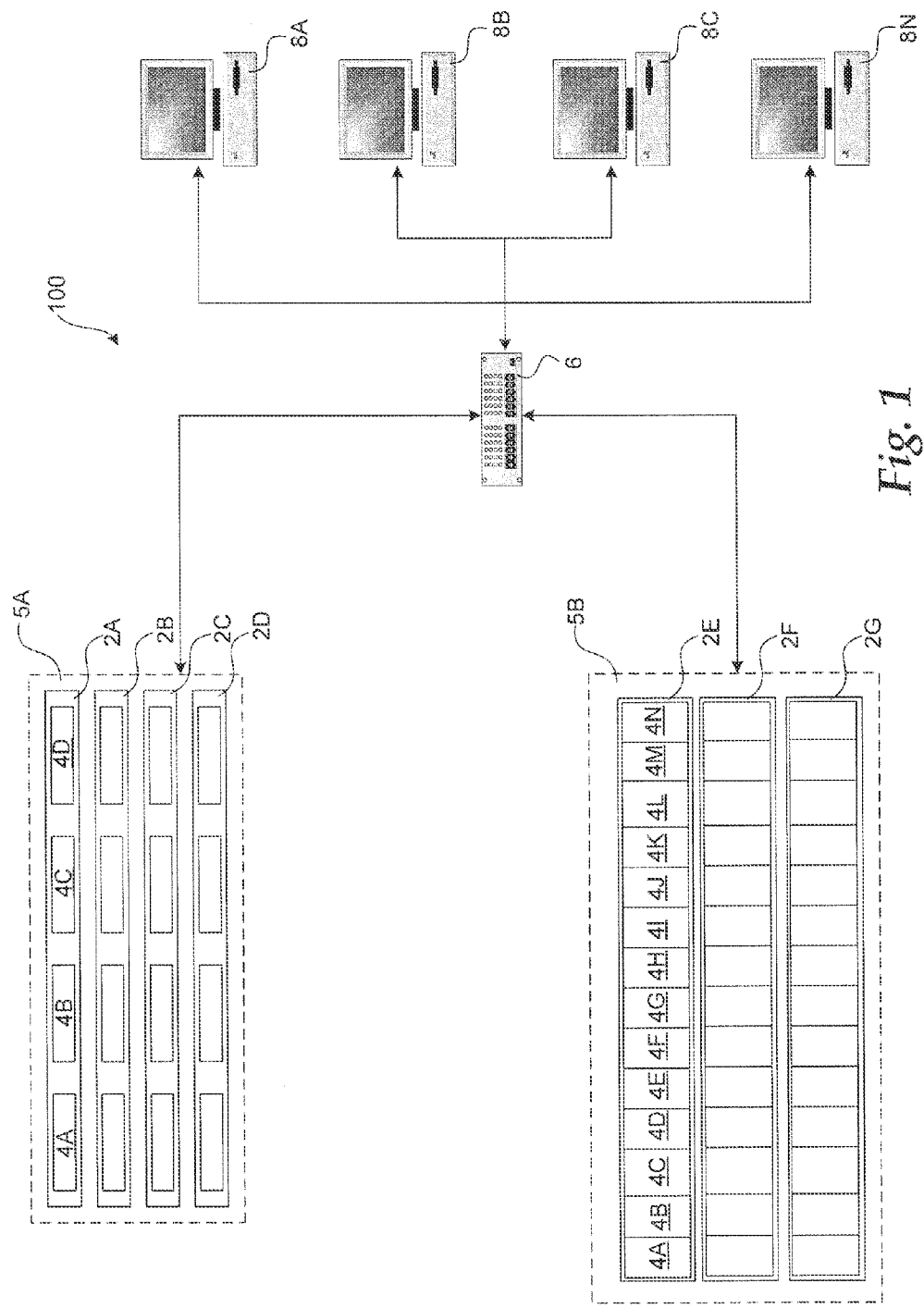
FIG. 1 is a network architecture diagram showing an illustrative operating environment for the embodiments presented herein.

The following detailed description is directed to technologies for providing networked RAID in a virtualized storage cluster. Through the use of the embodiments presented herein, networked RAID can be implemented in a networked storage cluster in a manner that eliminates the compound network read and write operations and distributed locking mechanisms required in previous solutions.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing network RAID in a virtualized storage cluster will be described.

Turning now to FIG. 1, details will be provided regarding an illustrative operating environment for the implementations presented herein. In particular, FIG. 1 is a network architecture diagram showing aspects of a storage system 100 that includes several virtualized clusters 5A-5B. As discussed briefly above, a virtualized storage cluster (also referred to herein as a "storage cluster" or a "cluster") is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G.

According to implementations, the nodes within a cluster may be housed in a one-rack space unit storing up to four hard disk drives. For instance, the node 2A is a one-rack space computing system that includes four hard disk drives 4A-4D. Alternatively, each node may be housed in a three-rack space unit storing up to fifteen hard disk drives. For instance, the node 2E includes fifteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes are configured together to create a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are together exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized, or peer, cluster. A cluster in which each node provides storage but the processing and mapping is done completely or primarily in a single node, is called a vertically virtualized cluster.

As will be described in greater detail below, data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance. Data striped across the nodes of a storage cluster may be organized into "zones." A "zone" represents the amount of data that is stored on each storage node in a storage cluster when data is striped across the storage nodes.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Figure 2:
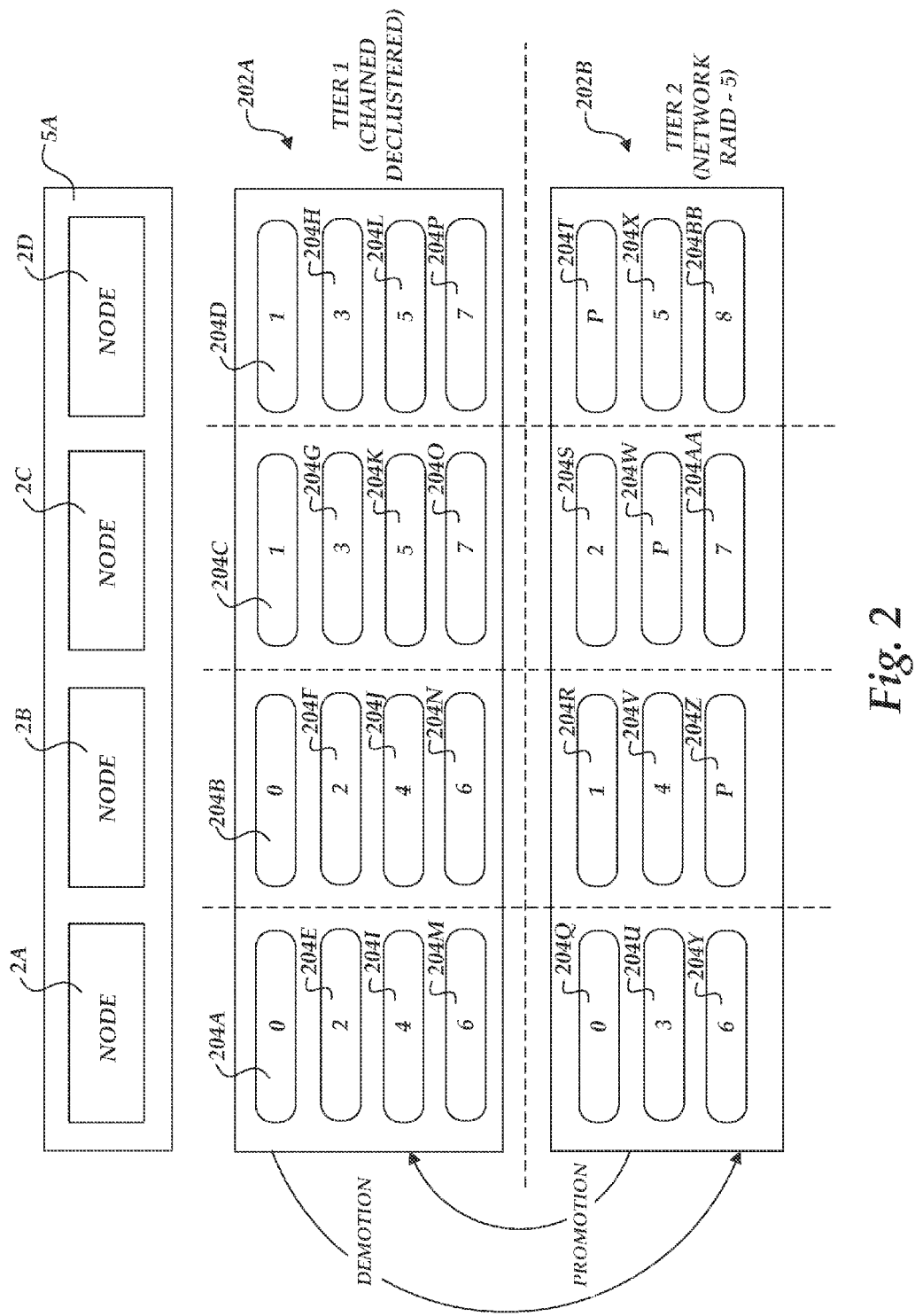
FIG. 2 is a data storage diagram showing aspects of an illustrative storage cluster that is utilized to embody aspects presented herein.

Referring now to FIG. 2, additional details regarding the configuration of a storage cluster 5A having four storage nodes 2A-2D in one embodiment will be described. As illustrated in FIG. 2, the storage node 2A stores the zones 204A, 204E, 204I, 204M, 204Q, 204U, and 204Y. The storage node 2B stores the zones 204B, 204F, 204J, 204N, 204R, 204S, 204W, and 204A. The storage node 2C stores the zones 204C, 204G, 204K, 204O, 204S, 204W, and 204AA. The storage node 2D stores the zones 204D, 204H, 204L, 204P, 204T, 204X, and 204BB.

The storage capacity exposed by the storage cluster 5A shown in FIG. 2 has also been divided into two tiers 202A-202B. A tier represents a portion of the storage capacity of a storage cluster. In one implementation, the tier 202A is implemented utilizing expensive high performance mass storage devices, such as serial attached SCSI ("SAS") hard disk drives. In this implementation, the tier 202B is implemented utilizing less expensive but lower performance mass storage devices, such as serial advanced technology attachment ("SATA") hard disk drives. It should be appreciated, therefore, that in this embodiment the storage capacity of the cluster 5A has been divided into the tiers 202A-202B based on the cost and performance of the mass storage devices allocated to each tier. Other factors may be similarly utilized to divide the mass storage capacity of a storage cluster into multiple tiers.

In the storage cluster 5A shown in FIG. 2, the zones 204A-204P are stored in the tier 202A while the zones 204Q-204BB are stored in the tier 202B. In this implementation, the zones 204A-204P stored in the tier 202A have been organized using a chained declustered configuration. A chained declustered configuration ensures that all data is stored on at least two nodes of a storage cluster. For instance, as shown in FIG. 2, the same data is stored in zones 204A and 204B. The same data is also stored in zones 204C and 204D, etc. In this manner, data is stored within at least two nodes of a storage cluster without the need for calculating parity as in a RAID configuration. This type of configuration, however, utilizes only 50% of the available storage.

In the implementation shown in FIG. 2, the zones 204Q-204BB stored in the tier 202B have been organized using a networked RAID configuration, in this case a networked RAID-5 configuration. In the networked RAID configuration, a parity zone must be computed for each stripe and stored in a node of the storage cluster. The zone 204T represents the parity zone for the zones 204Q-204S. The zone 204W represents the parity zone for the zones 204U-204V and 204X. The zone 204Z represents the parity zone for the zones 204Y and 204AA-204BB.

According to embodiments presented herein, the storage cluster 5A is operative to maintain information regarding the age, frequency of access, and other characteristics of the data stored on the storage nodes 2A-2D. Frequently used data contained in zones stored in the tier 202B is moved in the background to the tier 202A. This process is referred to herein as "promotion." Infrequently used data that is stored in zones in the tier 202A is moved in the background to the tier 202B.

This process is referred to herein as "demotion." By moving data between the zones 202A and 202B in this manner, the most frequently utilized data is maintained in the costlier but higher performance tier, while lesser-used data is maintained in the cheaper but lower performance tier. In this embodiment the size of zones in the tier 202A is the same as the size of zones in the tier 202B. This process is described in further detail below with respect to FIG. 3.

Figure 3:
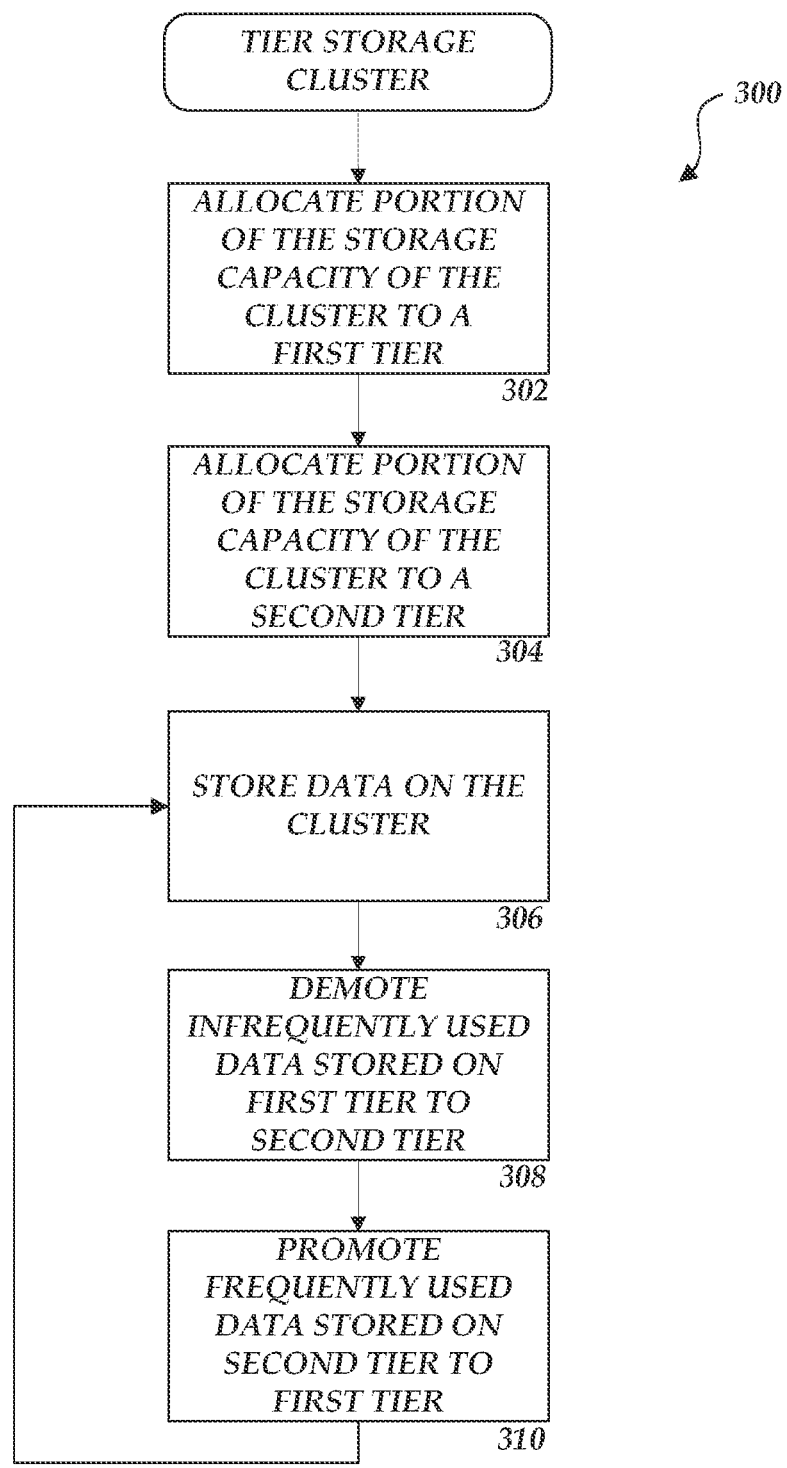
FIG. 3 is a flow diagram showing an illustrative routine for tiering the storage capacity of a storage cluster in one implementation.

Turning now to FIG. 3, additional details will be provided regarding the embodiments presented herein for providing networked RAID capabilities in a networked virtualized network storage cluster. In particular, FIG. 3 is a flow diagram showing a routine 300 that shows aspects of an illustrative process performed by the storage cluster 5A for tiering its storage capacity and for migrating data between the two tiers 202A-202B in one implementation. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where a portion of the storage capacity of the storage cluster 5A is allocated to the tier 202A. The routine 300 then continues to operation 304, where another portion of the storage capacity of the storage cluster 5A is allocated to the tier 202B. Once the tiers 202A and 202B have been allocated, the cluster 5A begins fielding I/Os and storing data at operation 306.

As discussed above, the cluster 5A maintains statistics regarding the age, frequency of use, and other statistics regarding the stored data. The storage cluster 5A utilizes these statistics at operation 308 to demote infrequently used data stored on the tier 202A to the tier 202B. In this embodiment, the demotion process involves only moving a zone from the tier 202A to the tier 202B. At operation 310, the storage cluster 5A utilizes the maintained statistics to promote frequently used data stored on the tier 202B to the tier 202A. In this embodiment, the promotion process involves only moving a zone from the tier 202B to the tier 202A. More efficient mechanisms of promoting and demoting zones will be presented below with reference to FIGS. 4-7. From operation 310, the routine 300 returns to operation 306, where the cluster 5A continues to field I/Os and promote and demote zones in the manner described above.

It should be appreciated that it is not trivial to restripe data between chained declustered and network RAID-5 configurations efficiently. This is because a network RAID-5 configuration requires central computation of parity for each stripe. The I/O overhead involved in restriping data becomes enormous: a single storage node has to read the data from all the other nodes, compute the parity, and then write the data according to the new configuration to all the nodes. For a four-node cluster, this would mean three reads, one parity computation, and three (or four) writes for each set of three zones of data. During this period, it may be required to lock all nodes in a distributed manner to prevent the data from changing underneath a parity computation.

Figure 4:
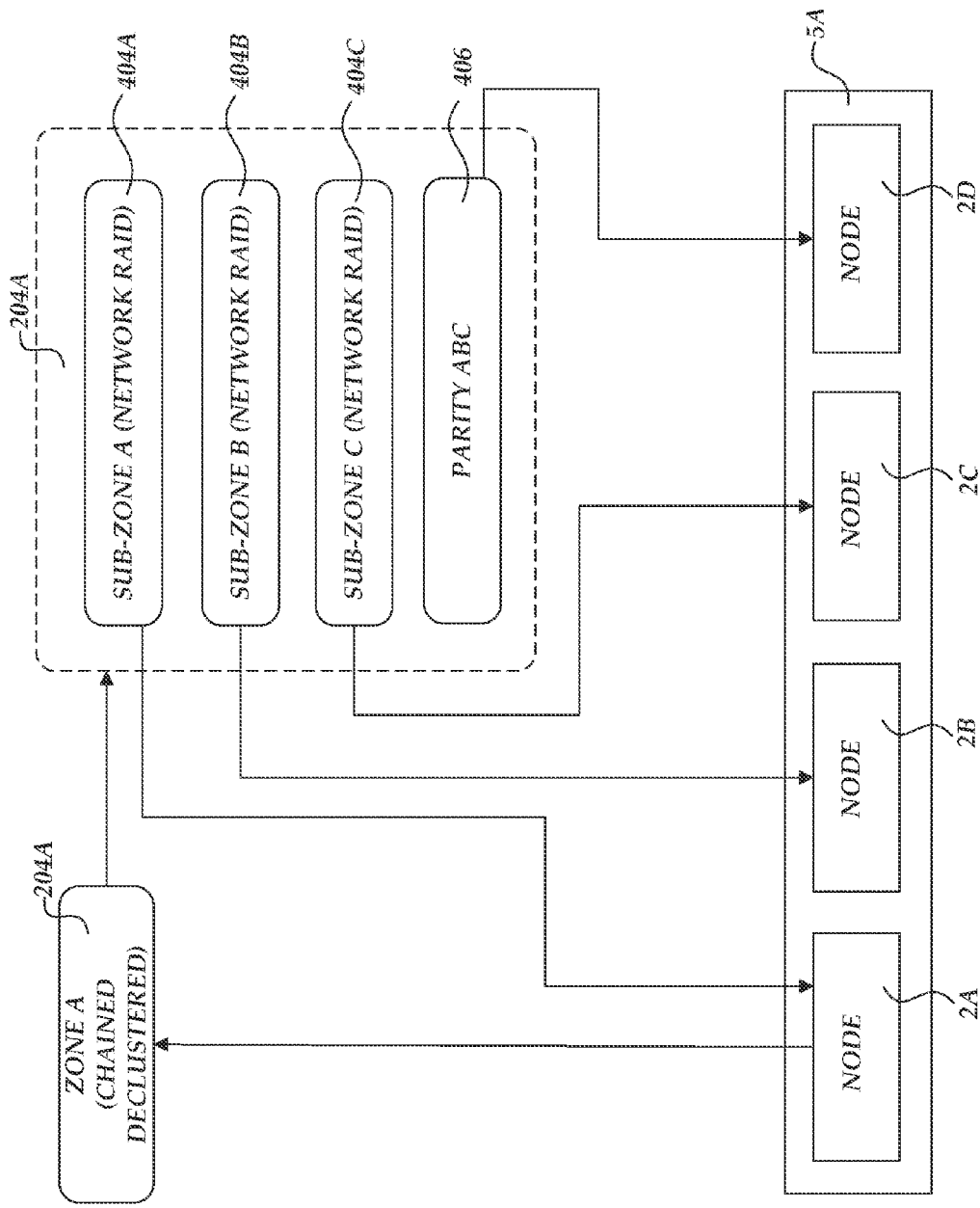
FIG. 4 is a data storage diagram showing additional aspects of the organization of the storage capacity of a storage cluster in one embodiment presented herein.
Figure 5:
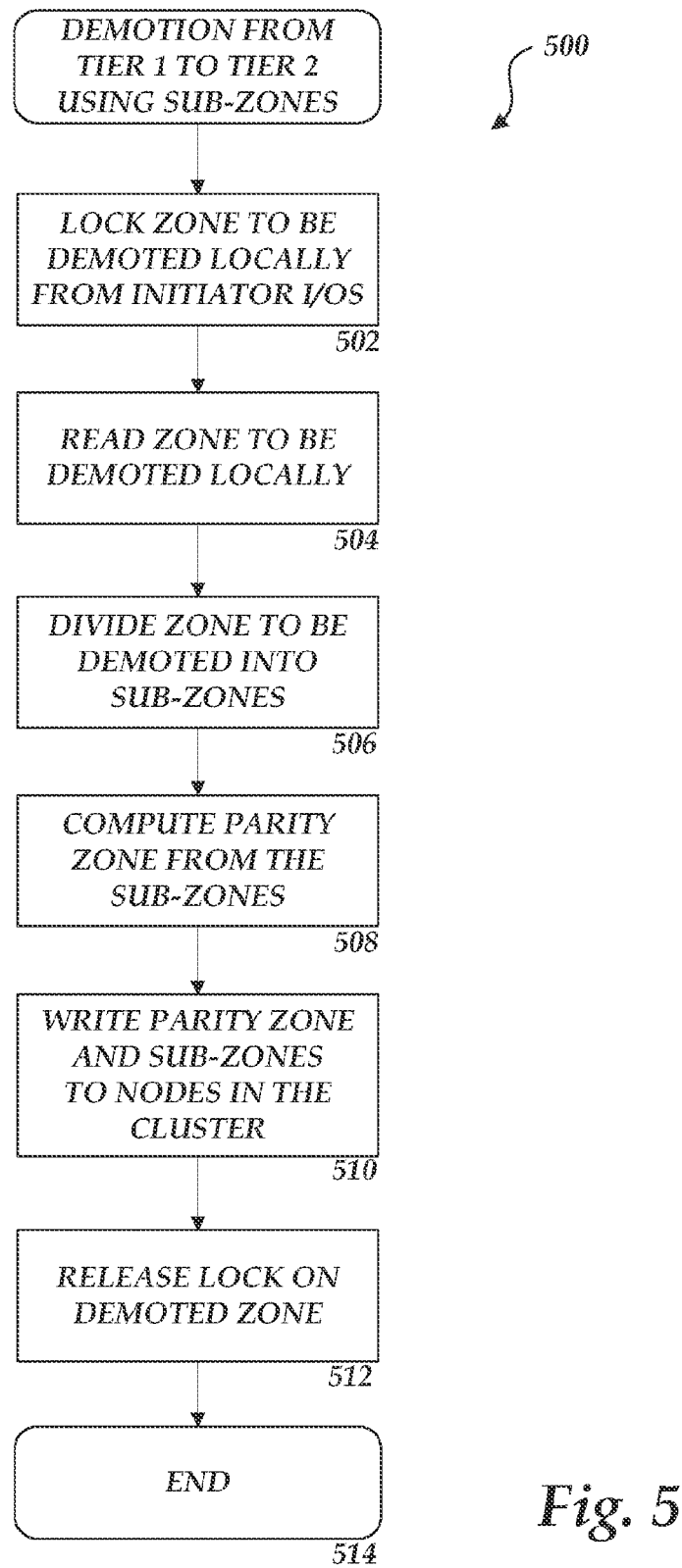
FIG. 5 is a flow diagram showing an illustrative routine for demoting data from a first tier in a storage cluster to a second tier of the storage cluster in one implementation.

In order to avoid this enormous computational overhead, one implementation provided herein utilizes different zone sizes for the chained declustered-configured tier 202A and the network RAID-configured tier 202B. This process is illustrated in FIGS. 4-5. In particular, FIG. 4 illustrates the process of demoting a zone 204A from a chained declustered tier 202A to the network raid tier 202B. In this example the storage cluster 5A has four nodes 2A-2D. In order to demote the zone 204A, the zone 204A is split into three sub-zones 404A-404C. The parity 406 of the three sub-zones 404A-404C is computed, for instance, by performing an XOR operation on the data stored in the three sub-zones 404A-404C. The sub-zones 404A-404C and the parity 406 are then stored in the tier 202B on different storage nodes. For instance, the sub-zone 404A is stored on the node 2A, the sub-zone 404B is stored on the node 2B, the sub-zone 404C is stored on the node 2C, and the parity 406 is stored on the node 2D. This process is illustrated further with respect to FIG. 5.

FIG. 5 is a flow diagram showing an illustrative routine 500 for demoting data from a first tier in a storage cluster to a second tier of the storage cluster in one implementation that utilizes sub-zones. The routine 500 begins at operation 502, where the zone to be demoted is locked locally at the storage node where it is stored. This prevents any initiator I/Os from accessing the zone to be demoted while the operation is performed. Once the zone to be demoted has been locally locked, the routine 500 continues to operation 504, where the zone to be demoted is read. Once the zone to be demoted has been read, the routine 500 continues to operation 506.

At operation 506, the zone to be demoted is divided into sub-zones. The number of sub-zones is dependent on the number of storage nodes in the cluster. Typically, if there are N storage nodes in the cluster, the zone will be divided into N−1 sub-zones. Once the zone to be demoted has been divided into sub-zones, the routine 500 continues to operation 508, where the parity of the sub-zones is computed. In one implementation, this is accomplished by performing an XOR operation on the sub-zones. Once the parity has been computed, the routine 500 continues to operation 510, where the sub-zones and the parity are written to the RAID tier of different nodes within the cluster in the manner described above with respect to FIG. 4. After the write operations have completed, the local lock on the zone to be demoted is released at operation 512. It should be appreciated that through the use of this algorithm the need for networked reads, networked locks, and large bottle-necking parity computations are avoided. The routine 500 then continues to operation 514, where it ends.

It should also be appreciated that a zone may be promoted from the networked RAID tier to the chained declustered-configured tier using sub-zones in the reverse manner. For instance, according to one implementation, a zone is promoted by first reading a sub-zone from each of the storage nodes in the second tier. The sub-zones are then assembling into a zone. The assembled zone is then stored in the chained declustered-configured tier of the storage cluster.

It should also be appreciated that the above-described algorithm lends itself well to massive parallelization. In particular, in embodiments, each node in a cluster may restripe its own zones independently with minimal cross-node locking of I/Os. In a cluster with a large number of nodes, ten for example, the process of restriping will be approximately ten times faster than if the restriping is done in the traditional manner. This kind of performance improvement makes it feasible to use the configuration in a tiered environment also.

Figure 6:
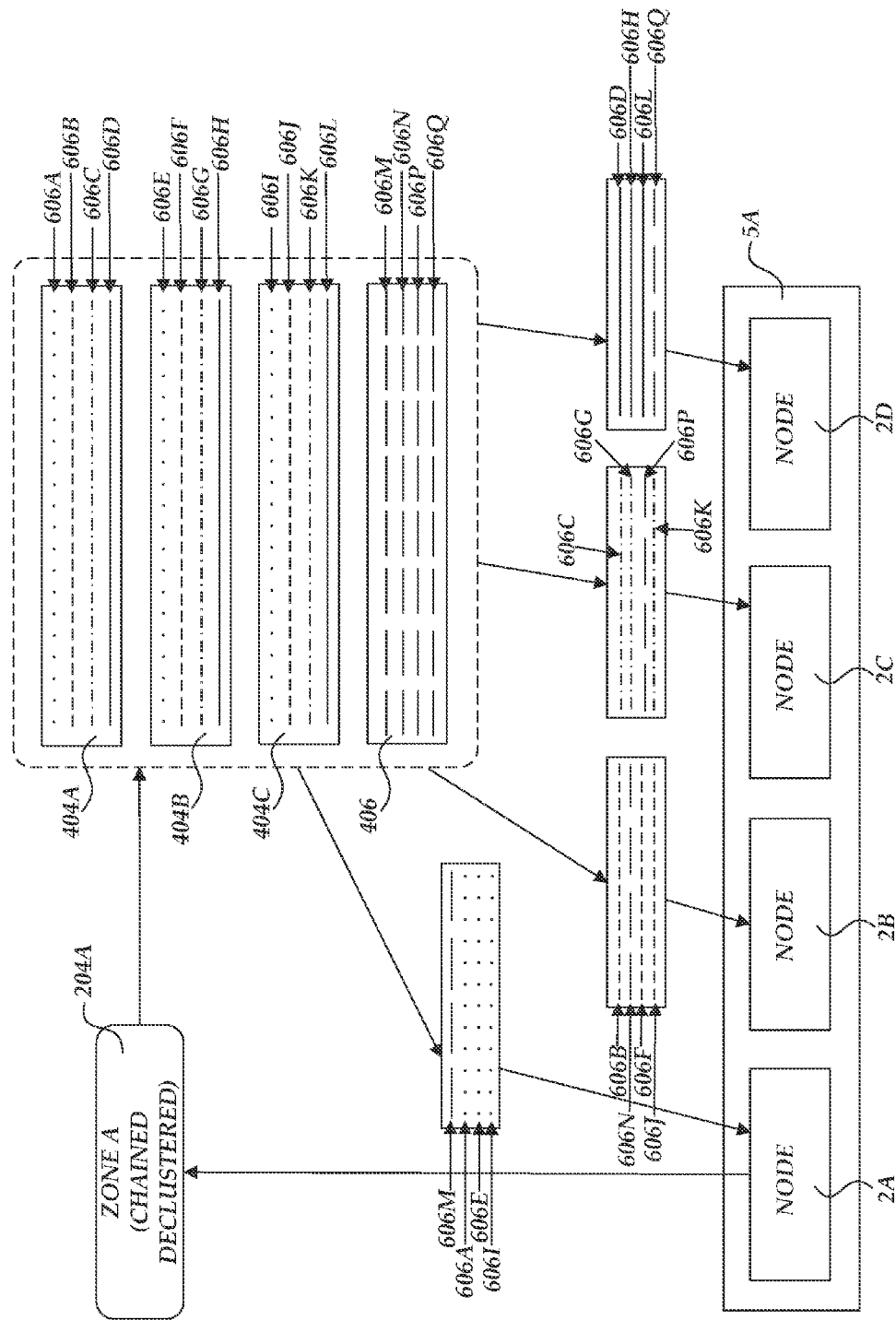
FIG. 6 is a data storage diagram showing additional aspects of the organization of the storage capacity of a storage cluster in another embodiment presented herein.
Figure 7:
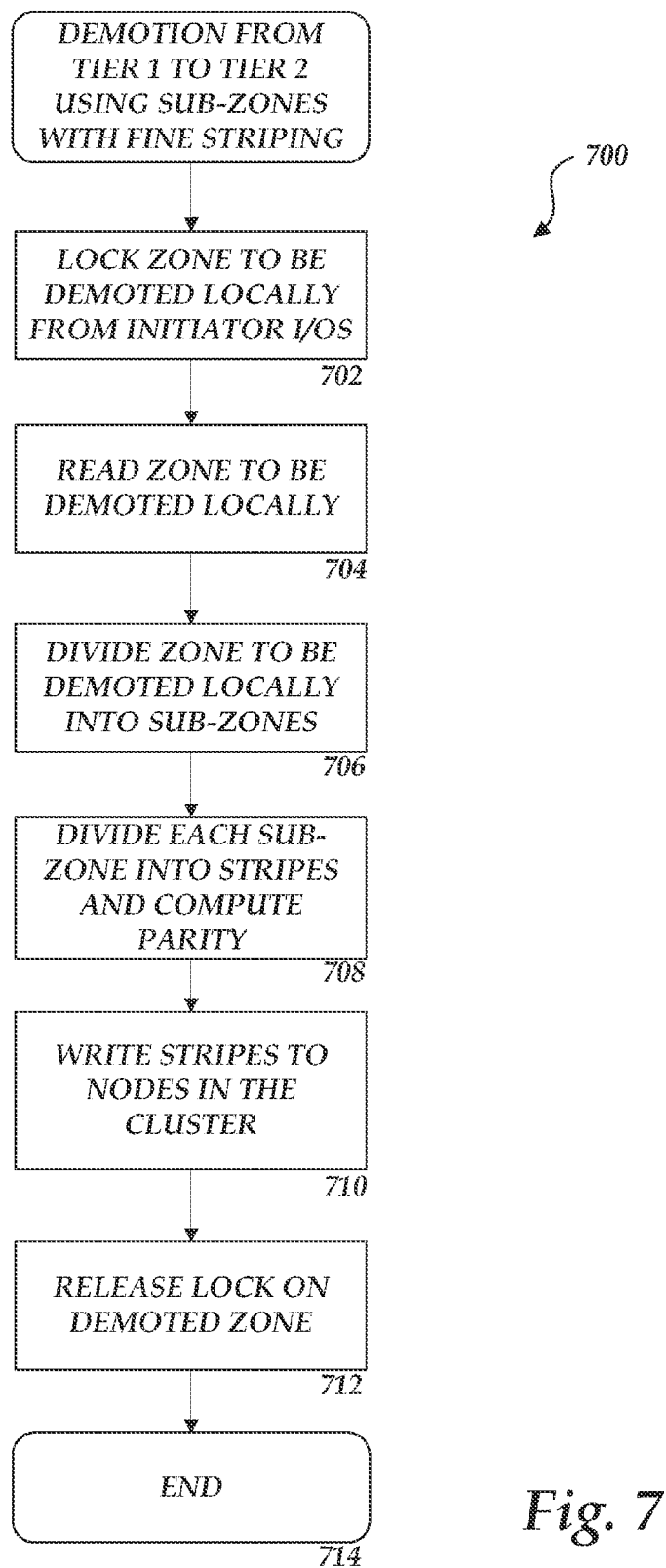
FIG. 7 is a flow diagram showing an illustrative routine for demoting data from a first tier in a storage cluster to a second tier of the storage cluster in another implementation presented herein.

By dividing a zone into multiple sub-zones and storing it across different storage nodes in the manner described above, it is possible to eliminate the performance penalties involved in restriping. It is, however, possible to further optimize the mechanism of restriping the sub-zones. FIGS. 6 and 7 illustrate the further optimization. In particular, FIG. 6 illustrates a process for demoting a zone 204A by subdividing each of the sub-zones 404A-404C even further. In this implementation, the sub-zones 404A-404C are divided into smaller stripes rather than storing the sub-zones contiguously on each node in the manner described above. For example, if a zone is 3 MB in size, it is divided into three 1 MB sub-zones. Instead of storing the first 1 MB in the first node, the second 1 MB in the second node, etc., it is possible to instead divide each sub-zone into even smaller stripes, and store the stripes on the storage nodes 2A-2D. This has the effect of reducing the zone size on the storage nodes 2A-2D even further.

The demotion of the zone 204A shown in FIG. 6 illustrates this process even further. For instance, in the example shown in FIG. 6, the sub-zone 404A has been subdivided into the stripes 606A-606D. The sub-zone 404B has been subdivided into the stripes 606E-606H. The sub-zone 404C has been divided into the stripes 606I-606L. The parity 406 includes stripes 606M-606Q that include the parity for each of the stripes. In this example, the stripes 606M, 606A, 606E, and 606I are stored on the node 2A, the stripes 606B, 606N, 606F, and 606J are stored on the node 2B, the stripes 606C, 606G, 606P, and 606K are stored on the node 2C, and the stripes 606D, 606H, 606L, and 606Q are stored on the node 2D. FIG. 7 illustrates this process further.

FIG. 7 is a flow diagram showing an illustrative routine 700 for demoting data from a first tier in a storage cluster to a second tier of the storage cluster in one implementation that further divides sub-zones into stripes. The routine 700 begins at operation 702, where the zone to be demoted is locked locally at the storage node where it is stored. This prevents any initiator I/Os from accessing the zone to be demoted while the zone operation is performed. Once the zone to be demoted has been locally locked, the routine 700 continues to operation 704, where the zone to be demoted is read. Once the zone to be demoted has been read, the routine 700 continues to operation 706.

At operation 706, the zone to be demoted is divided into sub-zones. Once the zone to be demoted has been divided into sub-zones, the routine 700 continues to operation 708, where each sub-zone is divided into stripes and the parity of the stripes is computed. In one implementation, this is accomplished by performing an XOR operation on the stripes. Once the parity has been computed, the routine 700 continues to operation 710, where the stripes and the parity are written to the RAID tier of different nodes within the cluster in the manner described above with respect to FIG. 6. After the write operations have completed, the local lock on the zone to be demoted is released at operation 712. It should be appreciated that a zone may be promoted in the reverse manner by reading stripes from each node in the storage cluster, assembling the stripes into sub-zones, assembling the sub-zones into a zone, and storing the assembled zone in the chained declustered-configured tier of the storage cluster. From operation 712, the routine 700 continues to operation 714, where it ends.

It should be appreciated that there are at least three benefits that accrue from the decrease in zone size permitted by the embodiment described with respect to FIGS. 6 and 7. The first is optimization for performance. In storage systems that have specific types of loads, for example the EXCHANGE SERVER mail system from MICROSOFT CORPORATION, almost always deliver a 4 kB random I/O load to a storage server, while databases typically deliver 8 kB random I/Os. It is, therefore, possible to align the stripe size with the size of the typical I/O. This allows a performance boost for both sequential and random I/Os of that size, since each I/O is completed in a particular node but both sequential and random I/Os fall in different boxes.

Second, it may not always be possible to choose zone sizes in which the parent and child zone sizes are multiples of each other with the quotient being a multiple of the number of nodes minus one. For example, if the parent zone size is 1 MB and a four node RAID-5 is to be implemented, it becomes impossible to divide 1 MB into three zones of equal size. If, as a compromise, the space is divided into four quarter-MB sub-zones, storing them on the three nodes will result in an imbalance. While it is possible to track these imbalances, this adds complexity to the algorithm, and it may be preferable to let the imbalance be with space on the other two nodes being allocated but not used. However, this results in two quarter-MB sub-zones being wasted on the two other nodes. If, instead, smaller sub-zones are used, the amount of wastage is much smaller as a result.

Third, it may be easier, from a low-level I/O perspective, to restripe zones if the new zone size is close to the native page size. In many operating systems, such a choice of the zone size permits the I/O structures used for reading data from the local machine to be split into multiple structures without performing a memory copy, and fired to different remote machines.

The algorithms described above are sufficient to implement a high-performance, robust tiered storage architecture to provide horizontal virtualized storage with both mirror and parity protection. However, if processing resources and architectural flexibility permit, it is possible to optimize this process even further. Most storage clusters may be expanded online by adding new nodes to them. It is highly desirable that this expansion be done rapidly and with minimal impact on front-side I/O performance. In this context, expanding a cluster that is either chained declustered or in a network RAID-5 configuration is not trivial. In the most naive implementation, each stripe must be read in its entirety according to an old layout, called a "map," and then be rewritten on all of the nodes according to a new map that corresponds to the new number of nodes, while making sure the appropriate locks have been acquired. This can be a cumbersome process, especially in the case of RAID-5; it may even be preferable not to expand the number of nodes at all for new I/Os and instead use the new mapping only for new I/Os. However, this compromises on the performance of the cluster.

The data placement algorithm ("DPA") described in co-pending U.S. patent application Ser. No. 11/551,274, filed on Oct. 20, 2006, and entitled "Expanding the Storage Capacity of a Virtualized Data Storage System", and in co-pending U.S. patent application Ser. No. 11/551,291, filed on Oct. 20, 2006, and entitled "Providing Redundancy in a Storage System" provides a solution to this issue. The DPA includes a series of maps that fix a layout of zones for a certain number of nodes. The DPA has two unique properties. First, the DPA ensures that when a new storage node is added to a cluster and data is re-striped between the storage nodes, only data that will subsequently reside in the new storage node is moved to the new storage node during re-striping. The DPA also ensures that no movement of data occurs between two storage nodes that existed in the storage cluster prior to the addition of the new storage node. So, a chained declustered setup can be expanded effortlessly and efficiently using an implementation of the DPA. Other mechanisms may also be utilized to stripe data across the storage nodes of a storage cluster.

The DPA can also be used for expanding network RAID-5 implementations. This is accomplished by numbering all sub-zones, including the data and parity, in sequential order, and then following the DPA tables to expand. This expansion is not exactly the same as the expansion of a corresponding RAID-5 on disks, since the number of parity zones remains the same for the old and new configuration (instead of decreasing to reflect the larger number of zones that share a parity zone). However, the benefits due to improved restriping time outweigh the loss in space. The performance in this case scales the same way as with conventional RAID-5 implementations. U.S. patent application Ser. No. 11/551,274 and U.S. patent application Ser. No. 11/551,291 identified above describe the DPA in detail and are expressly incorporated herein by reference in their entirety.

By utilizing the algorithms described in this document, it is possible to circumvent two of the most restrictive drawbacks of network RAID: performance and migration delay. The performance of network RAID is typically low, but using it in an effective tiered storage server as presented herein allows the user to utilize faster chained declustered storage for frontline I/Os, and reserves the network RAID for data that is infrequently accessed. Migration delay is mitigated by using an adaptive zone size, through the concept of sub-zoning. In this way, an effective tiered storage cluster, using different levels of RAID, provide greatly improved TCO of a storage system, while maintaining high levels of data protection and average performance.

Figure 8:
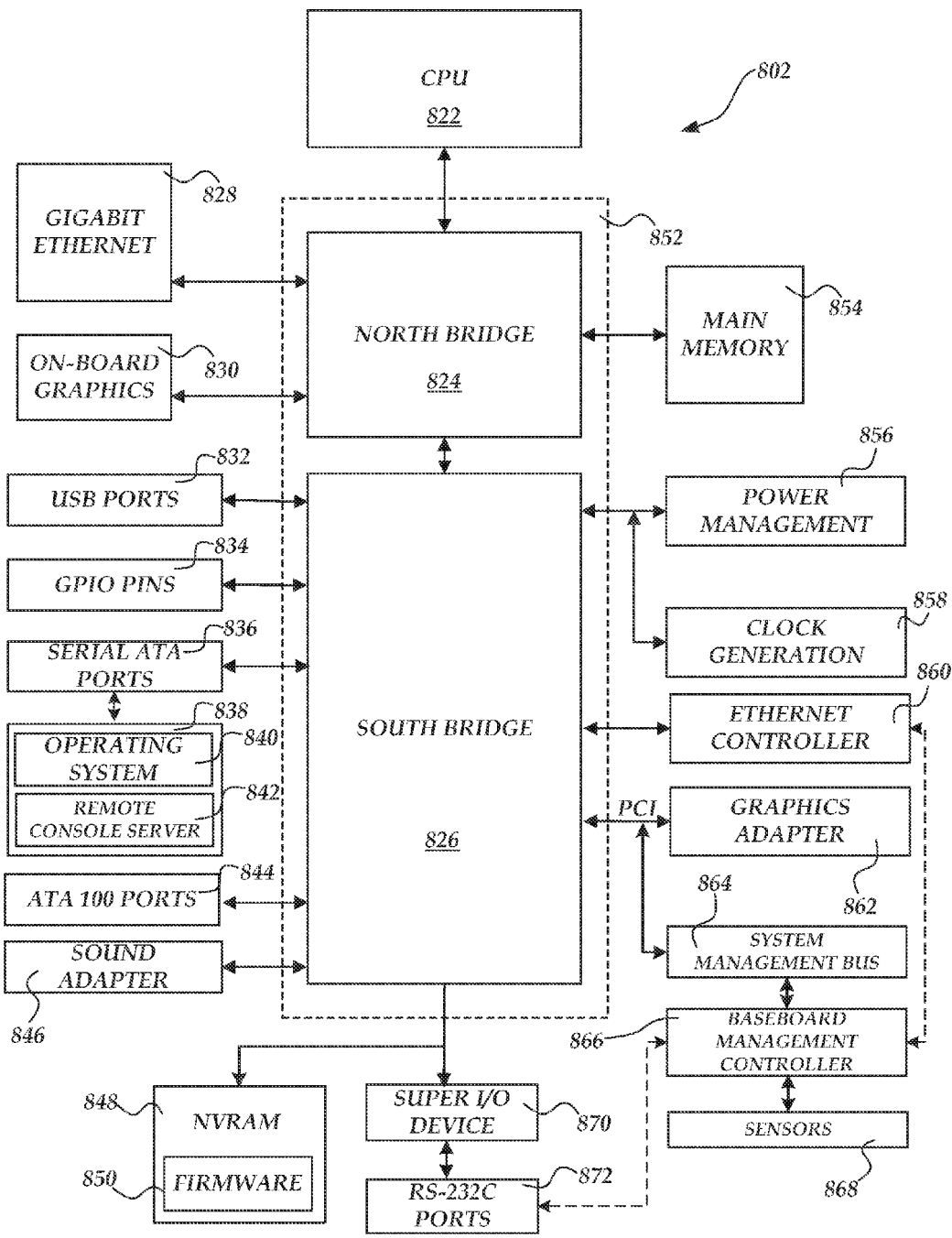
FIG. 8 is a computer architecture diagram showing an illustrative computer hardware architecture for a storage node computing system capable of implementing aspects of the embodiments presented herein.

FIG. 8 shows an illustrative computer architecture for a computer 800 capable of executing the software components described herein for implementing network RAID in a virtual storage cluster. In particular, the computer architecture shown in FIG. 8 provides a simplified view of the architecture of a conventional server computer 802 and may be utilized to implement the storage nodes 2.

FIG. 8 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The server computer 802 includes a baseboard, or "motherboard", which is a printed circuit board to which a multitude of components or devices may be connected by way of a system bus or other electrical communication path. In one illustrative embodiment, a CPU 822 operates in conjunction with a chipset 852. The CPU 822 is a standard central processor that performs arithmetic and logical operations necessary for the operation of the computer. The server computer 802 may include a multitude of CPUs 822.

The chipset 852 includes a north bridge 824 and a south bridge 826. The north bridge 824 provides an interface between the CPU 822 and the remainder of the computer 802. The north bridge 824 also provides an interface to a random access memory ("RAM") used as the main memory 854 in the computer 802 and, possibly, to an on-board graphics adapter 830. The north bridge 824 may also include functionality for providing networking functionality through a gigabit Ethernet adapter 828. The gigabit Ethernet adapter 828 is capable of connecting the computer 802 to another computer via a network. Connections which may be made by the network adapter 828 may include LAN or WAN connections. LAN and WAN networking environments are commonplace in offices, enterprise-wide computer networks, intranets, and the internet. The north bridge 824 is connected to the south bridge 826.

The south bridge 826 is responsible for controlling many of the input/output functions of the computer 802. In particular, the south bridge 826 may provide one or more universal serial bus ("USB") ports 832, a sound adapter 846, an Ethernet controller 860, and one or more general purpose input/output ("GPIO") pins 834. The south bridge 826 may also provide a bus for interfacing peripheral card devices such as a graphics adapter 862. In one embodiment, the bus comprises a peripheral component interconnect ("PCI") bus. The south bridge 826 may also provide a system management bus 864 for use in managing the various components of the computer 802. Additional details regarding the operation of the system management bus 864 and its connected components are provided below.

The south bridge 826 is also operative to provide one or more interfaces for connecting mass storage devices to the computer 802. For instance, according to an embodiment, the south bridge 826 includes a serial advanced technology attachment ("SATA") adapter for providing one or more serial ATA ports 836 and an ATA 100 adapter for providing one or more ATA 100 ports 844. The serial ATA ports 836 and the ATA 100 ports 844 may be, in turn, connected to one or more mass storage devices storing an operating system 840 and application programs, such as the SATA disk drive 838. As known to those skilled in the art, an operating system 840 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 840 comprises the LINUX operating system. According to another embodiment of the invention the operating system 840 comprises the WINDOWS SERVER operating system from MICROSOFT CORPORATION. According to another embodiment, the operating system 840 comprises the UNIX or SOLARIS operating system. It should be appreciated that other operating systems may also be utilized.

The mass storage devices connected to the south bridge 826, and their associated computer-readable media, provide non-volatile storage for the computer 802. Although the description of computer-readable media contained herein refers to a mass storage device, such as a hard disk or CD-ROM drive, it should be appreciated by those skilled in the art that computer-readable media can be any available media that can be accessed by the computer 802. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 826 for connecting a "Super I/O" device 870. The Super I/O device 870 is responsible for providing a number of input/output ports, including a keyboard port, a mouse port, a serial interface 872, a parallel port, and other types of input/output ports. The LPC interface may also connect a computer storage media such as a ROM or a flash memory such as a NVRAM 848 for storing the firmware 850 that includes program code containing the basic routines that help to start up the computer 802 and to transfer information between elements within the computer 802.

As described briefly above, the south bridge 826 may include a system management bus 864. The system management bus 864 may include a BMC 866. In general, the BMC 866 is a microcontroller that monitors operation of the computer system 802. In a more specific embodiment, the BMC 866 monitors health-related aspects associated with the computer system 802, such as, but not limited to, the temperature of one or more components of the computer system 802, speed of rotational components (e.g., spindle motor, CPU Fan, etc.) within the system, the voltage across or applied to one or more components within the system 802, and the available or used capacity of memory devices within the system 802. To accomplish these monitoring functions, the BMC 866 is communicatively connected to one or more components by way of the management bus 864. In an embodiment, these components include sensor devices for measuring various operating and performance-related parameters within the computer system 802. The sensor devices may be either hardware or software based components configured or programmed to measure or detect one or more of the various operating and performance-related parameters. The BMC 866 functions as the master on the management bus 864 in most circumstances, but may also function as either a master or a slave in other circumstances. Each of the various components communicatively connected to the BMC 866 by way of the management bus 864 is addressed using a slave address. The management bus 864 is used by the BMC 866 to request and/or receive various operating and performance-related parameters from one or more components, which are also communicatively connected to the management bus 864.

It should be appreciated that the computer 802 may comprise other types of computing devices, including hand-held computers, embedded computer systems, personal digital assistants, and other types of computing devices known to those skilled in the art. It is also contemplated that the computer 802 may not include all of the components shown in FIG. 8, may include other components that are not explicitly shown in FIG. 8, or may utilize an architecture completely different than that shown in FIG. 8.

Based on the foregoing, it should be appreciated that technologies for providing networked RAID in a virtualized storage cluster are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for utilizing a networked redundant array of inexpensive disks (RAID) configuration in a networked storage cluster having two or more storage server computers that exposes a storage capacity to one or more initiators, each of the storage server computers being operative to read and write data to one or more mass storage devices, the method comprising:

allocating a first portion of the storage capacity of the storage cluster to a first tier, wherein data stored in the first tier is organized in a chained declustered configuration, the first portion of the storage capacity comprising a first plurality of mass storage devices including at least one mass storage device associated with each of the storage server computers;

allocating a second portion of the storage capacity of the storage cluster to a second tier, wherein data stored in the second tier is organized in a networked RAID-5 configuration, the second portion of the storage capacity comprising a second plurality of mass storage devices including at least one mass storage device associated with each of the storage server computers;

monitoring a frequency at which the data stored in the first tier and the data stored in the second tier is accessed, respectively; and promoting data that is accessed frequently from the second tier to the first tier, and demoting data that is accessed infrequently from the first tier to the second tier, wherein the first tier and the second tier are subdivided into zones having a same size, and wherein the first plurality of mass storage devices is different than the second plurality of mass storage devices.

2. The method of claim 1, wherein promoting data that is accessed frequently comprises moving a zone from the second tier to the first tier.

3. The method of claim 1, wherein demoting data that is accessed infrequently comprises moving a zone from the first tier to the second tier.

4. The method of claim 1, wherein the first and second portions of the storage capacity comprise different one or more storage server computers of the two or more storage server computers of the storage cluster, respectively.

5. The method of claim 1, wherein the first plurality of mass storage devices comprise higher performance mass storage devices than the second plurality of mass storage devices.

6. A non-transitory computer-readable storage medium having computer-executable instructions stored thereon for utilizing a networked redundant array of inexpensive disks (RAID) configuration in a networked storage cluster having two or more storage server computers that exposes a storage capacity to one or more initiators, each of the storage server computers being operative to read and write data to one or more mass storage devices, which, when executed by a computer system, cause the computer system to:

allocate a first portion of a storage capacity to a first tier, the first tier being organized in a chained declustered configuration, the first portion of the storage capacity comprising a first plurality of mass storage devices including at least one mass storage device associated with each of the storage server computers;

allocate a second portion of a storage capacity to a second tier, the second tier being organized in a networked RAID configuration, the second portion of the storage capacity comprising a second plurality of mass storage devices including at least one mass storage device associated with each of the storage server computers;

monitor a frequency at which the data stored in the first tier and the data stored in the second tier is accessed, respectively; and promote data that is accessed frequently from the second tier to the first tier, and demote data that is accessed infrequently from the first tier to the second tier, wherein the first tier and the second tier are subdivided into zones having a same size, and wherein the first plurality of mass storage devices is different than the second plurality of mass storage devices.

7. The non-transitory computer-readable storage medium of claim 6, wherein promoting data that is accessed frequently comprises moving a zone from the second tier to the first tier.

8. The non-transitory computer-readable storage medium of claim 6, wherein demoting data that is accessed infrequently comprises moving a zone from the first tier to the second tier.

9. The non-transitory computer-readable storage medium of claim 6, wherein the first and second portions of the storage capacity comprise different one or more storage server computers of the two or more storage server computers of the storage cluster, respectively.

10. The non-transitory computer-readable storage medium of claim 6, wherein the first plurality of mass storage devices comprise higher performance mass storage devices than the second plurality of mass storage devices.

11. A method for utilizing a networked redundant array of inexpensive disks (RAID) configuration in a storage cluster having two or more storage server computers that exposes a storage capacity to one or more initiators, each of the storage server computers being operative to read and write data to one or more mass storage devices, the method comprising:

allocating a first portion of the storage capacity of the storage cluster to a first tier, wherein data stored in the first tier is organized into one or more zones having a predetermined size that are stored in a chained declustered configuration, the first portion of the storage capacity comprising a first plurality of mass storage devices including at least one mass storage device associated with each of the storage server computers;

allocating a second portion of the storage capacity of the storage cluster to a second tier, wherein data stored in the second tier is organized into one or more zones having the predetermined size of the first tier, the one or more zones being stored in a networked RAID-5 configuration, the second portion of the storage capacity comprising a second plurality of mass storage devices including at least one mass storage device associated with each of the storage server computers;

monitoring a frequency at which the data stored in the first tier and the data stored in the second tier is accessed, respectively; and promoting data in a first zone that is accessed frequently by moving the first zone from the second tier to the first tier, and demoting data in a second zone that is accessed infrequently by moving the second zone from the first tier to the second tier, and wherein the first plurality of mass storage devices is different than the second plurality of mass storage devices.

12. The method of claim 11, wherein the first and second portions of the storage capacity comprise different one or more storage server computers of the two or more storage server computers of the storage cluster, respectively.

13. The method of claim 11, wherein the first plurality of mass storage devices comprise higher performance mass storage devices than the second plurality of mass storage devices.

\* \* \* \* \*